Nov. 28, 1967  C. A. CRESWELL  3,354,632
AUTOMATIC BELT MAKING MACHINE
Filed June 11, 1965  10 Sheets-Sheet 1
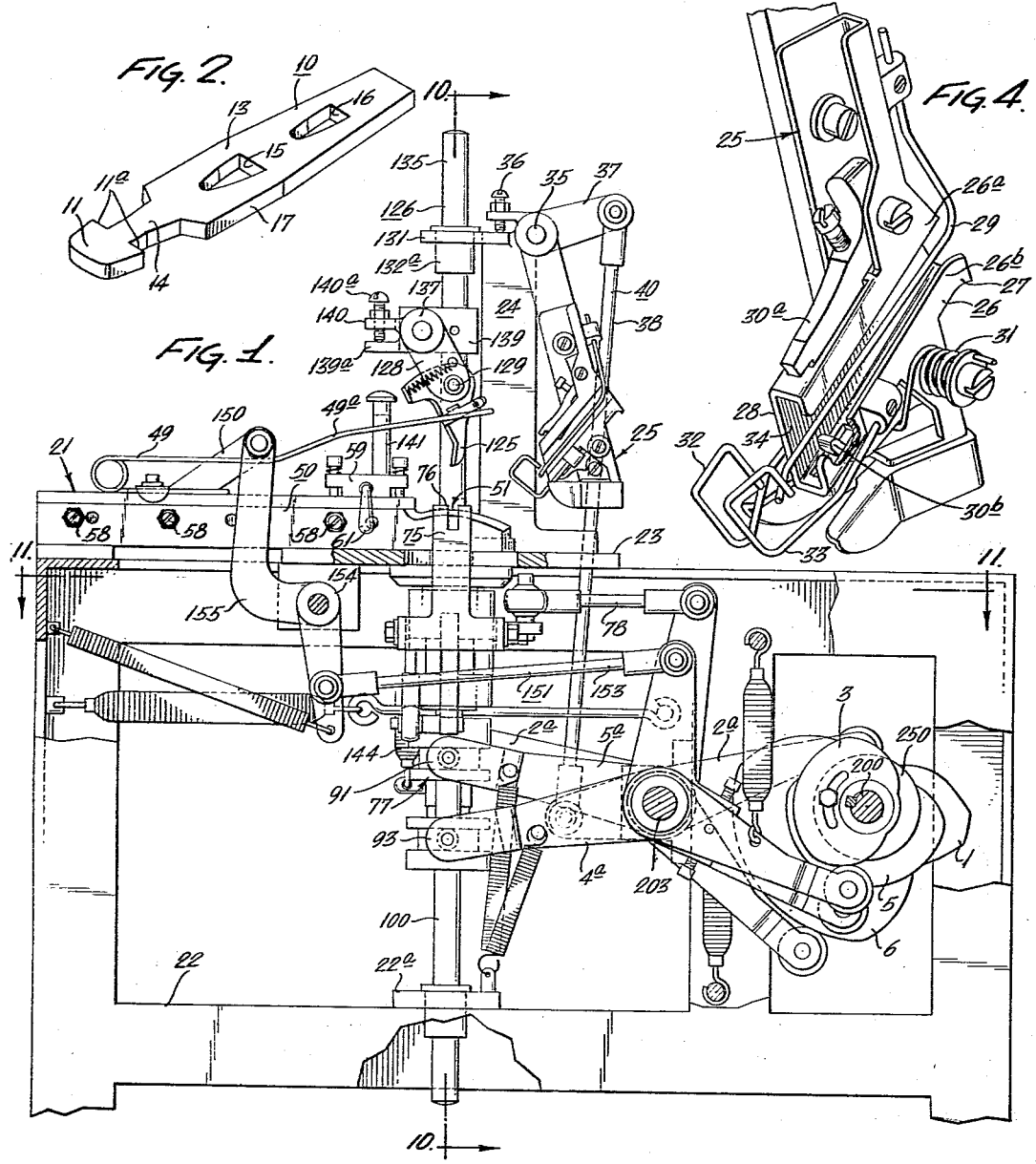
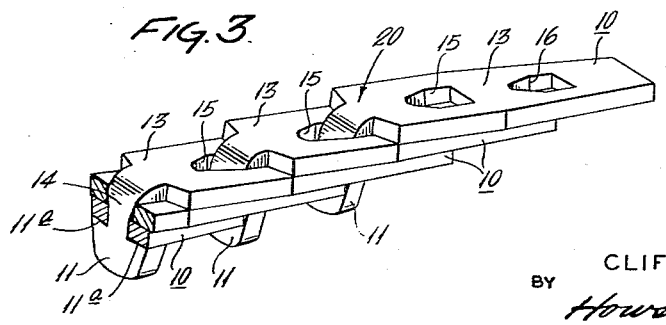
INVENTOR:
CLIFFORD A. CRESWELL
BY
Howson & Howson
ATTYS

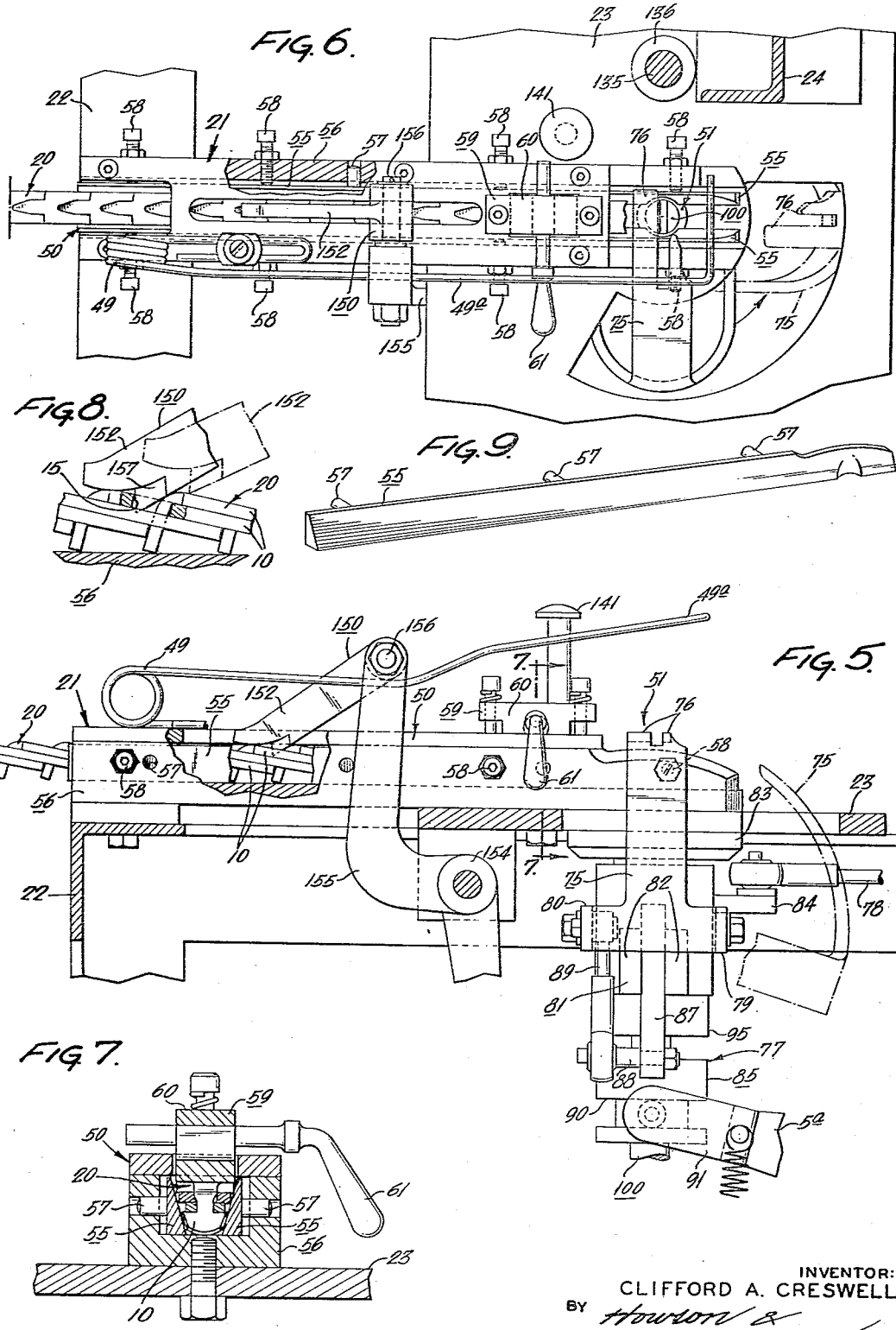

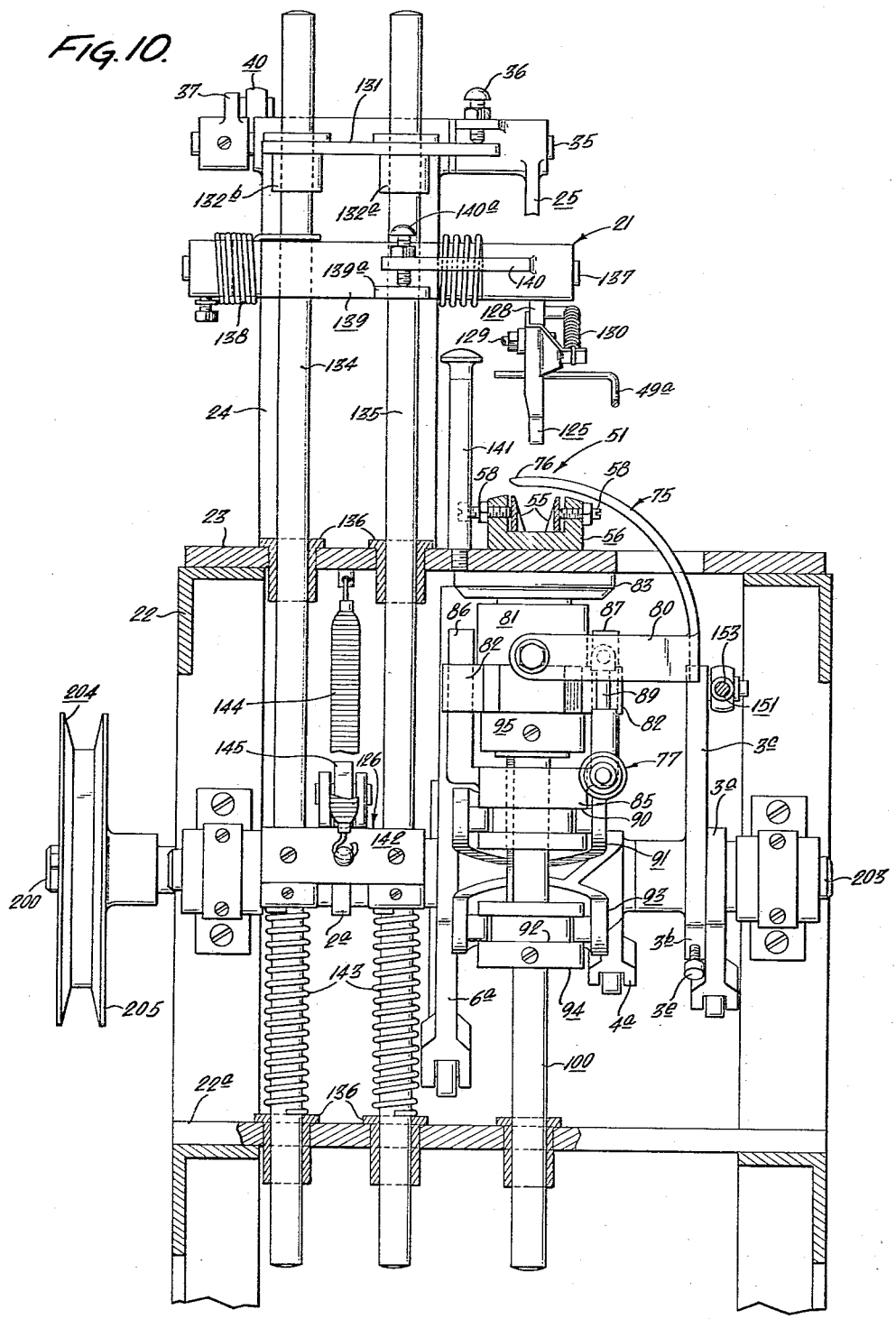

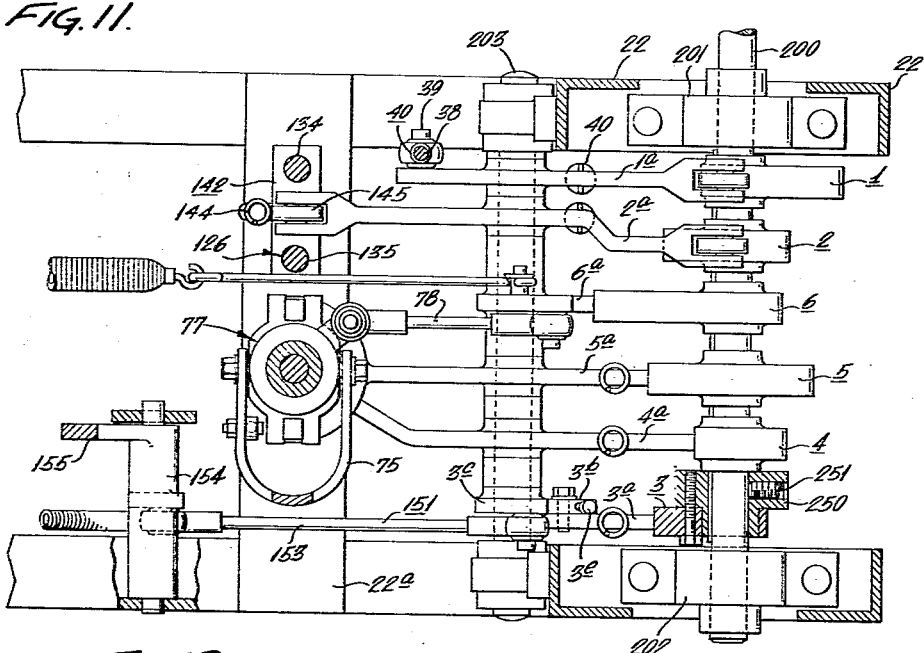

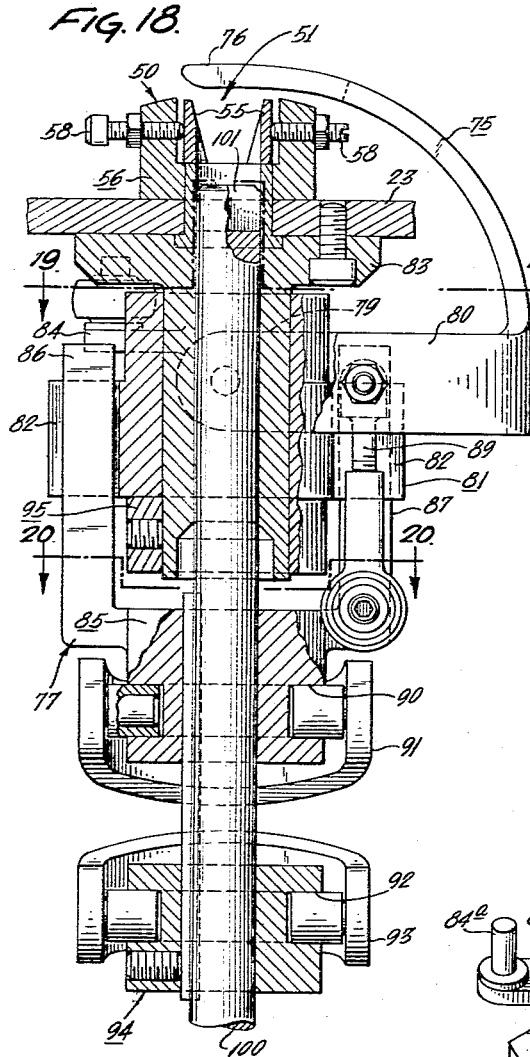
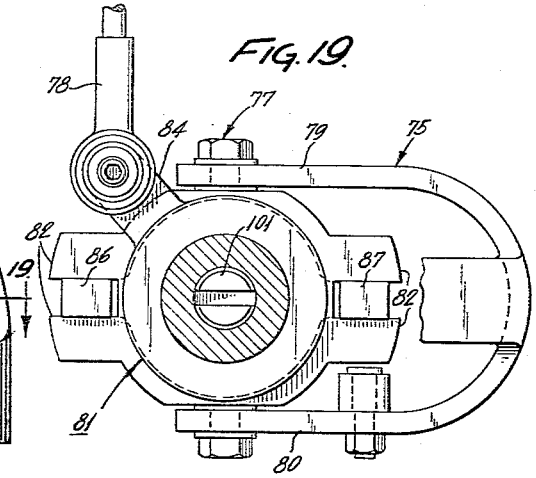
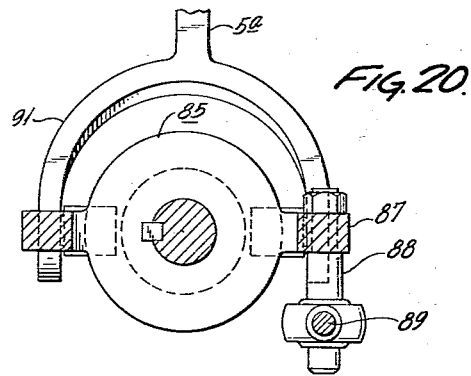
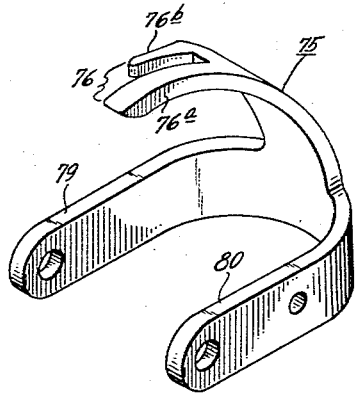
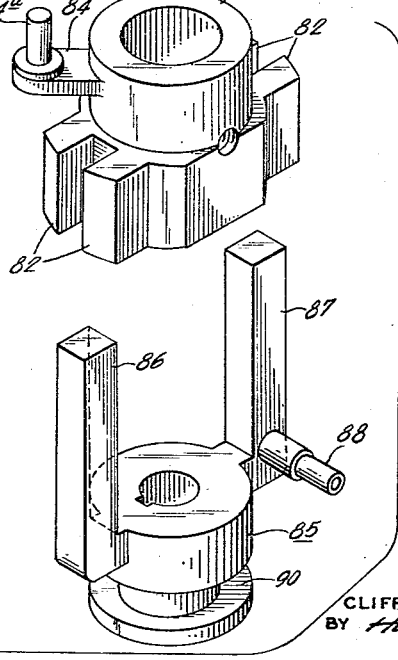

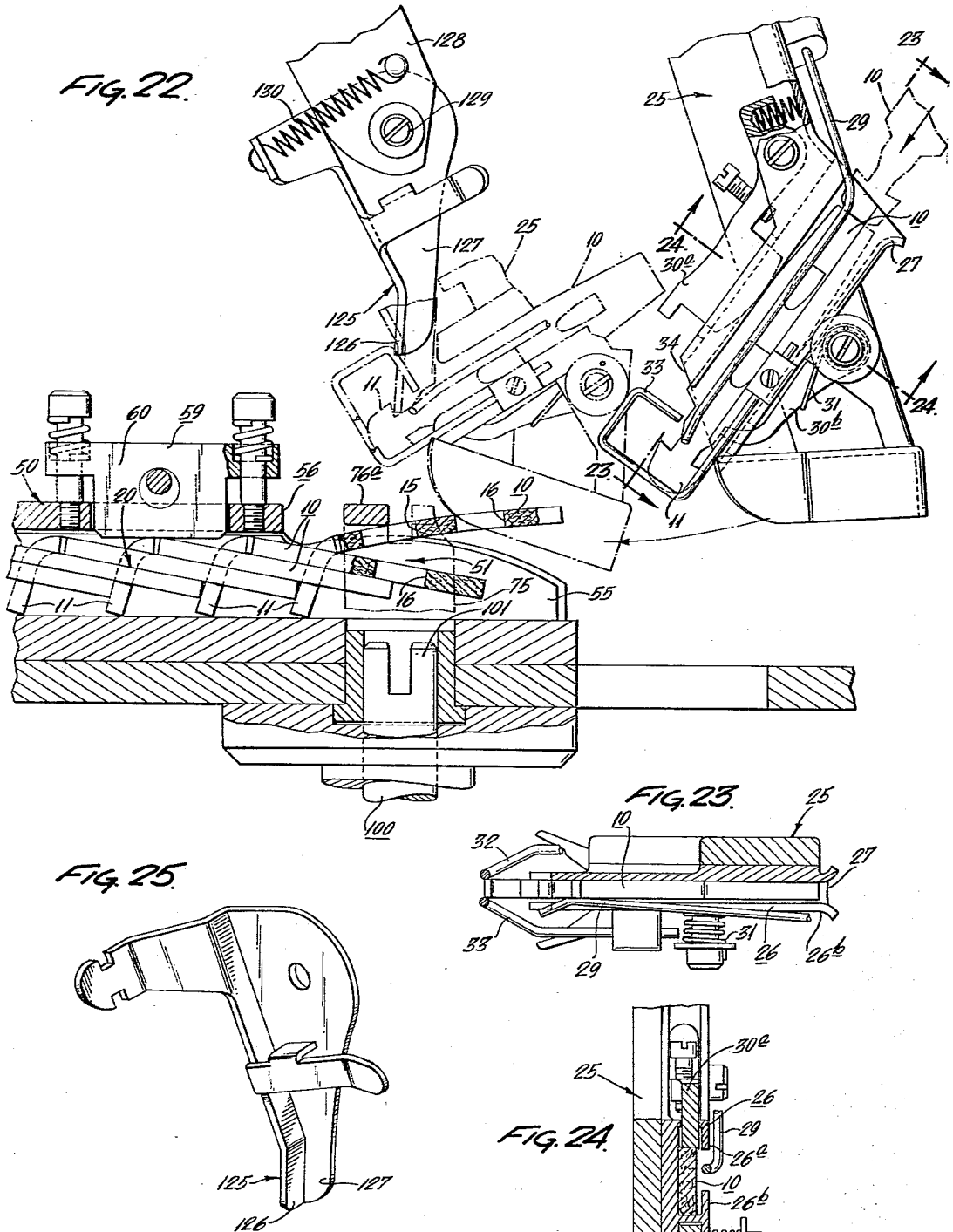

Nov. 28, 1967  C. A. CRESWELL  3,354,632
AUTOMATIC BELT MAKING MACHINE
Filed June 11, 1965  10 Sheets-Sheet 7
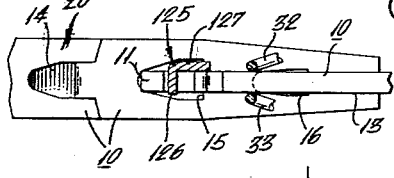
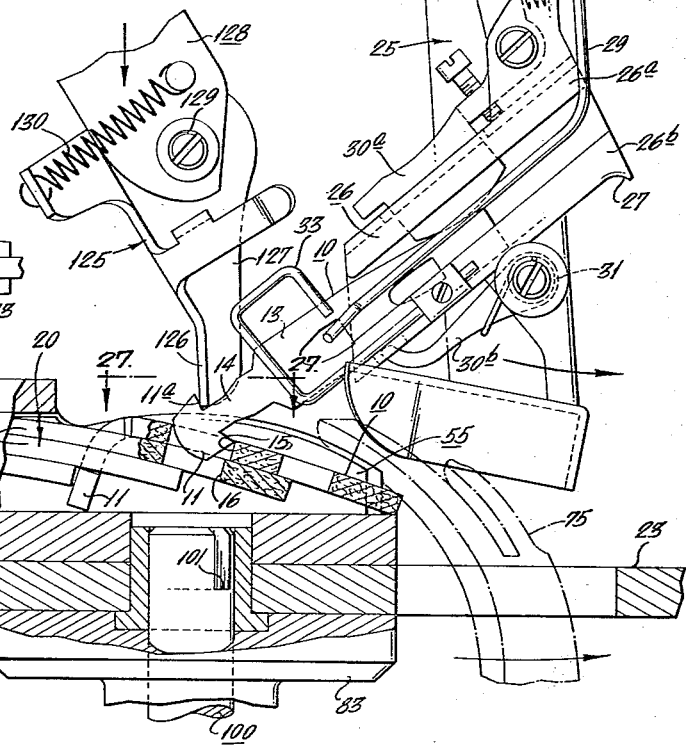
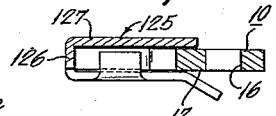
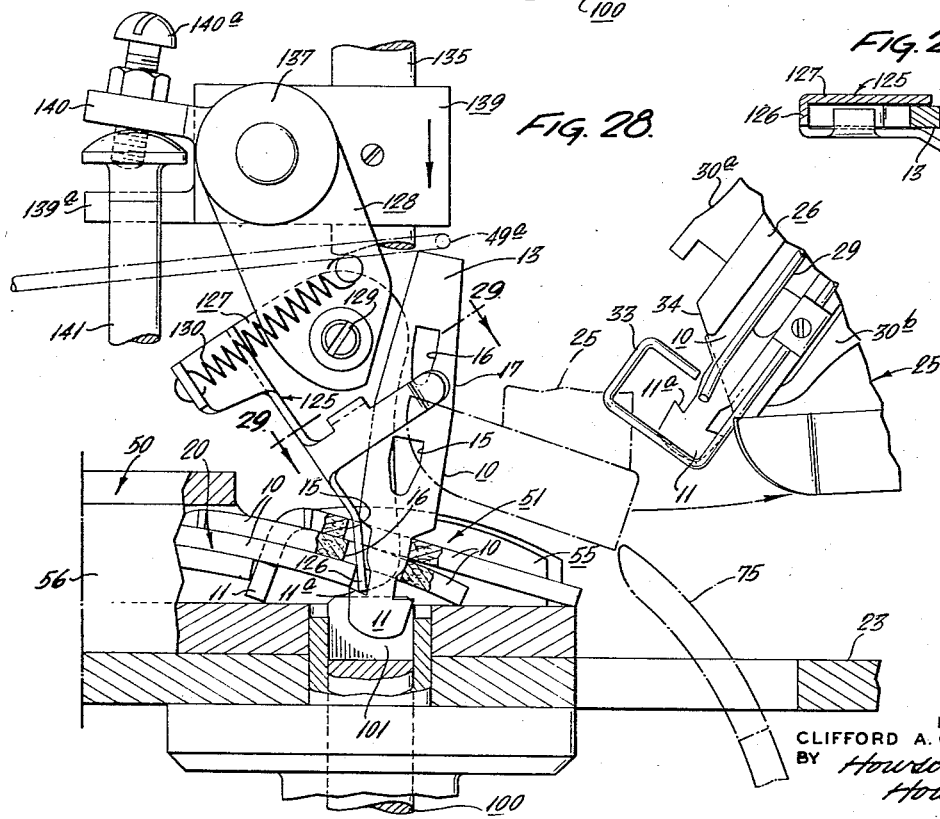
INVENTOR:
CLIFFORD A. CRESWELL
BY Howson & Howson
ATTYS.

Nov. 28, 1967  C. A. CRESWELL  3,354,632
AUTOMATIC BELT MAKING MACHINE
Filed June 11, 1965  10 Sheets-Sheet 8
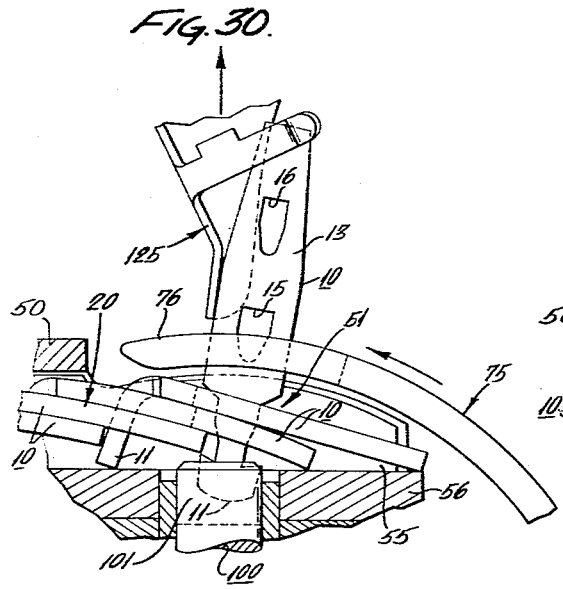
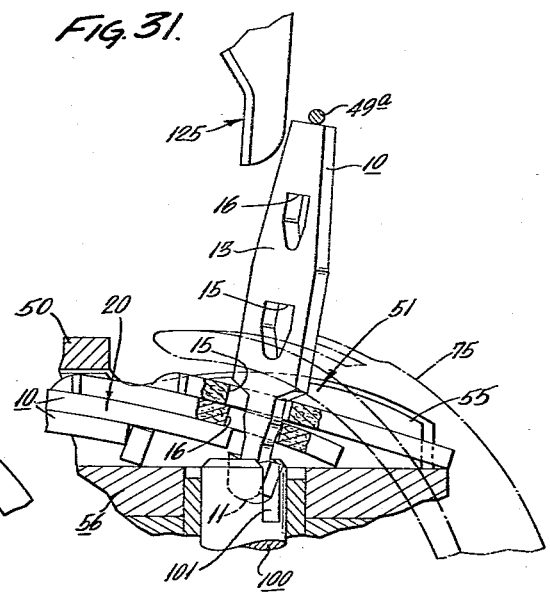
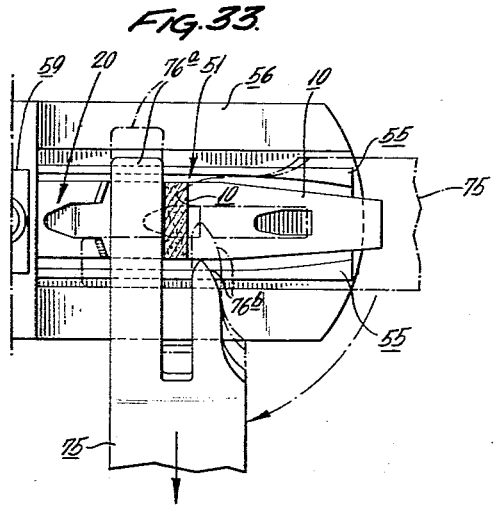
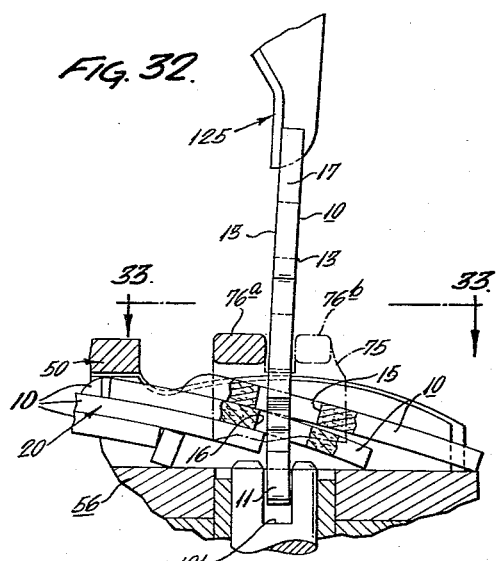
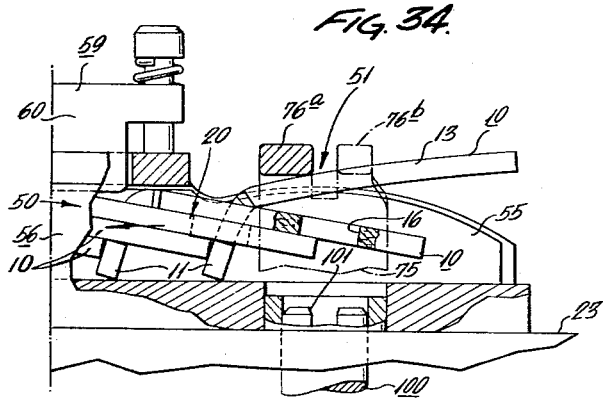
INVENTOR:
CLIFFORD A. CRESWELL
BY Howson & Howson
ATTYS.

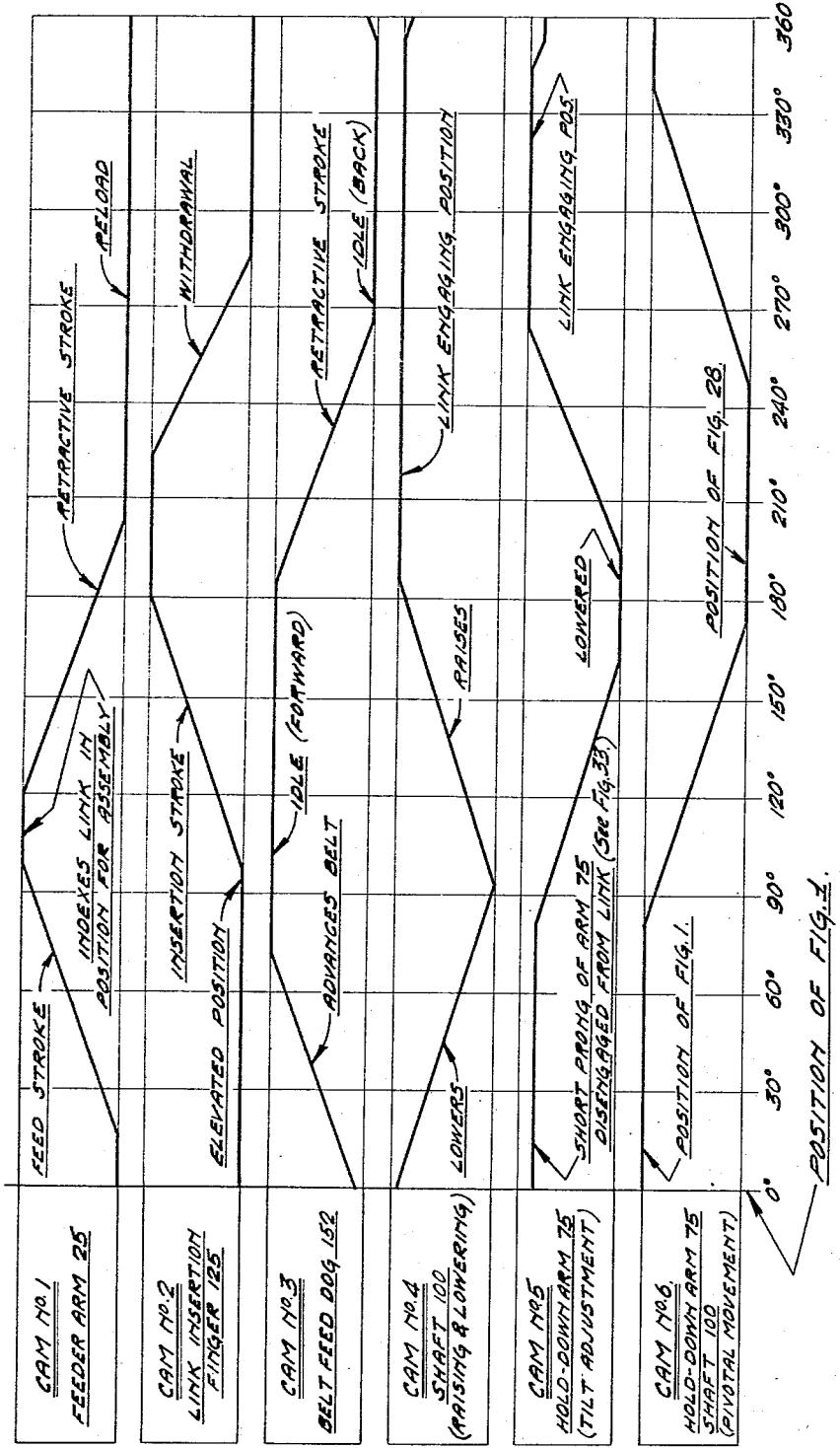

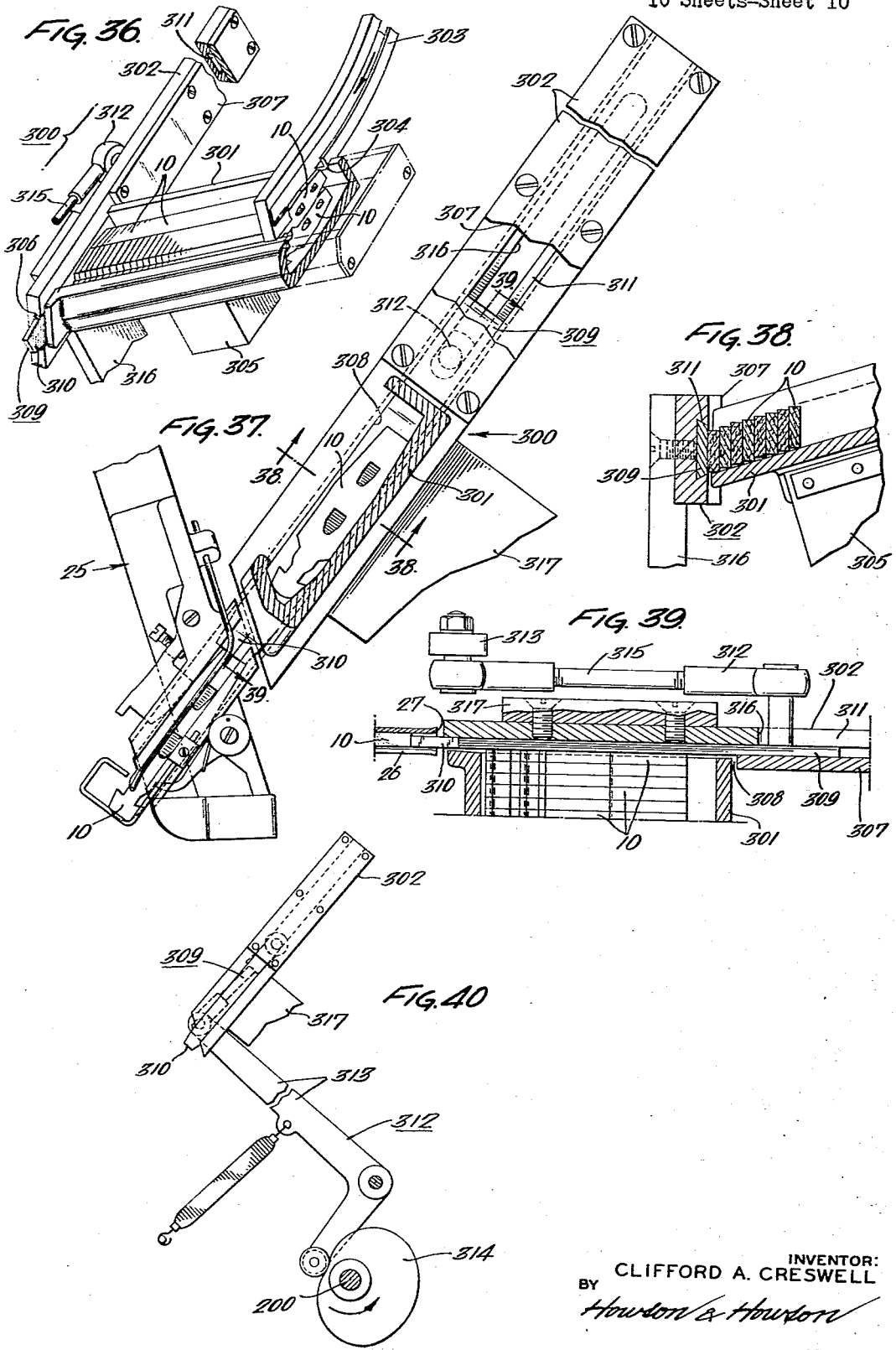

United States Patent Office 3,354,632
Patented Nov. 28, 1967

3,354,632
AUTOMATIC BELT MAKING MACHINE
Clifford Allen Creswell, Lancaster, Pa., assignor to The Arbee Corporation, Manheim, Pa., a corporation of Pennsylvania
Filed June 11, 1965, Ser. No. 463,286
14 Claims. (Cl. 59—3)

The present invention relates to a new and useful automatic belt fabrication machine, and more particularly to a self-contained machine which in its operation assembles a belt from a plurality of precut links, the belt and links being of the type disclosed in the Creswell Patent No. 3,154,961 issued on Nov. 3, 1964.

Link type belts employing integral fastening means obviate the necessity of metallic fastening means, such as washers and rivets, and are relatively new in the art of link type belts for use for light to medium drives. Link type belts of the type set forth in the above-cited patent are generally composed of, for example, a synthetic material comprising a polyester fabric such as Dacron, and a properly compounded synthetic material such as neoprene, butyl, nitrile, Penton and certain urethane elastomers. In order that the links may hold together in their proper relation, the composition of the link type belt with an integral fastener is, although somewhat resilient, relatively stiff. The stiffness makes it difficult to assemble the links, at least in any great number, by hand. Further, as may be imagined, to hand assemble a rather long belt of such material is a waste of time and thus is economically unsound.

Certain of the prior art, for example United States Patent #2,508,191, issued to Joseph Raggi on May 16, 1950, discloses an automatic belt making machine. The Raggi machine is utilized for fabricating link type belts, having soft and relatively pliable links, into a garment type belt. However, the apparatus disclosed by Raggi is unsuitable for fabrication of a link type belt utilized for drive purposes.

In view of the above, it is a principal object of the present invention to provide a machine to automatically assemble a link type belt that may be utilized for drive purposes.

Another object of the present invention is to provide a machine to automatically fabricate or assemble a link type belt of the type disclosed in U.S. Patents #3,154,961 and #3,154,960, Creswell, both issued on Nov. 3, 1964.

Still another object of the present invention is to provide an automatic belt making machine which may quickly and easily assemble in a continuous manner link type belting efficiently and economically, and which machine may be either driven by hand or by any mechanized drive means.

Other objects and a fuller understanding of the invention may be had by referring to the following description and claims taken in conjunction with the accompanying drawings in which:

FIG. 1 is a fragmentary side elevational view of apparatus constructed in accordance with the present invention;

FIG. 2 is a perspective view of a typical link which may be assembled into a belt on the apparatus illustrated in FIG. 1;

FIG. 3 is a fragmentary perspective view of a portion of a belt assembled in the apparatus of FIG. 1;

FIG. 4 is a fragmentary enlarged perspective view of a portion of the apparatus illustrated in FIG. 1;

FIG. 5 is a fragmentary enlarged side elevational view of a portion of the apparatus illustrated in FIG. 1;

FIG. 6 is a plan view of the apparatus illustrated fragmentarily in FIG. 5;

FIG. 7 is a fragmentary sectional view taken along line 7—7 of FIG. 5;

FIG. 8 is an enlarged fragmentary sectional view of a portion of the belt and the device illustrated in FIG. 5 as being broken away;

FIG. 9 is a perspective view of a portion of the apparatus illustrated in FIGS. 5 and 6 and removed from the apparatus to enable a better view thereof;

FIG. 10 is an enlarged sectional view taken along line 10—10 of FIG. 1;

FIG. 11 is a fragmentary sectional view taken along line 11—11 of FIG. 1;

FIGS. 12–17 are fragmentary side elevational views of portions of the apparatus illustrated in FIG. 11, and removed from the apparatus to better illustrate the interconnection thereof to various other portions of the apparatus;

FIG. 18 is an enlarged fragmentary sectional view of a portion of the apparatus illustrated in FIG. 10;

FIG. 19 is a sectional view taken along line 19—19 of FIG. 18;

FIG. 20 is a fragmentary sectional view taken along line 20—20 of FIG. 18;

FIG. 21 is a perspective view of a certain elements removed from the apparatus illustrated in FIGS. 18–20;

FIG. 22 is an enlarged fragmentary sectional view of a portion of the apparatus illustrated in FIG. 1 and moving from a first to a second position as shown by the solid and dashed lines;

FIG. 23 is a fragmentary sectional view taken along line 23—23 of FIG. 22;

FIG. 24 is a fragmentary sectional view taken along line 24—24 of FIG. 22;

FIG. 25 is a perspective of a portion of the apparatus illustrated in FIG. 22;

FIG. 26 is an additional view of the apparatus illustrated in FIG. 22 and moved to a different position;

FIG. 27 is a sectional view taken along line 27—27 of FIG. 26;

FIG. 28 is an enlarged fragmentary sectional view of the apparatus illustrated in FIG. 26 and yet moved to still another position;

FIG. 29 is a fragmentary sectional view taken along line 29—29 of FIG. 28;

FIG. 30 is a fragmentary sectional view of a portion of the apparatus illustrated in FIG. 28 and shown in a different position;

FIG. 31 is a view similar to FIG. 30 with the apparatus shown therein moved to still another position;

FIG. 32 is a fragmentary view of the apparatus illustrated in FIG. 31 with the device in yet another position;

FIG. 33 is a plan view taken along line 33—33 of FIG. 32;

FIG. 34 is a fragmentary sectional view of the apparatus illustrated in FIG. 33 with the belt moved to another position;

FIG. 35 is a sequential operating diagram of the cams illustrated in FIGS. 11–17;

FIG. 36 is a fragmentary perspective view of automatic link feed apparatus which may be utilized in conjunction with the apparatus of the present invention;

FIG. 37 is a fragmentary enlarged side elevational view of a portion of the apparatus illustrated in FIG. 36;

FIG. 38 is a fragmentary sectional view taken along line 38—38 of FIG. 37;

FIG. 39 is a fragmentary sectional view taken along line 39—39 of FIG. 37; and

FIG. 40 is a reduced scale, diagrammatic illustration of means by which the link feed apparatus may be driven.

*Introduction*

As set forth in the preamble of this specification the present invention relates to novel apparatus for assemblying or fabricating a link type belt, for example of the type belt disclosed in U.S. Patent #3,154,961. For purposes of orientation, as shown in FIG. 3, a belt 20 comprises a plurality of superimposed links 10 joined together by integral fastening means. As illustrated in FIG. 2 each fastening means comprises a locking tab 11 having rearwardly facing shoulders 11a, joined to a body portion 13 having a peripheral edge 17, through a constricted neck portion 14. As illustrated in FIG. 3, in the present instance the locking tab 11 is spaced a sufficient distance from the body 13 to receive therebetween two of the links 10.

The links are provided with at least one, in the present instance two registering apertures for receiving the locking tabs 11 and the neck 14 of preceding links 10 as they are assembled in superimposed overlapping relation. As illustrated in FIG. 2, each link 10 is provided with a forward aperture 15 and a trailing aperture 16 whereby upon assembly, in successive superimposed overlapping relation, the trailing aperture 16 registers with the forward aperture 15 of the adjacent link so that the locking tab 11 of the overlapping link first passes through the forward aperture 15 of the adjacent link and then through the trailing aperture 16 of the innermost link. For ease of belt assembly, both of the apertures are longer in the axial direction than they are wide so that the locking tab 11 of the link to be assembled in superimposed relation, may be aligned axially with the apertures and thereby pass more easily through the apertures.

For purposes of clarity the specification is conveniently divided into the following sections: General Description of the Machine and its Operation; Timing of the Machine; Link Feed Arm and Its Operation; Link Insertion Finger and Its Operation; Hold Down Arm and Tab Twister and Its Operation; Belt Indexing Mechanism and Its Operation; and Summary of Operation.

*General description of the machine and its operation.*

Referring now to the drawings, and especially FIG. 1 thereof, an automatic belt assemblying machine 21 including frame 22 is illustrated therein. A feeder arm 25 serves to receive, hold and feed individual links 10 for assembly into the belt 20, such as heretofore described. As illustrated in FIG. 6 a track 50, having a working area 51 for receiving the last link of a plurality of links 10 which have been fastened in superimposed overlapping relation, is aligned with the feeder arm 25, and the previously inserted link 10 is held in a flat position by a curved hold down arm 75 having a split terminal end 76. Beneath the working area 51 is a vertically oriented shaft 100 having an upwardly facing bifurcated terminus 101 (see FIG. 22) which bifurcation is aligned with the forward aperture 15 in the last link 10 of the belt 20 lying in the track 50.

In operation the feeder arm 25 moves a new link 10 into position above the forward aperture 15 in the last link 10 of the belt 20 lying in the track 50, the tab 11 of the new link 10 pointing towards the aperture and aligned with its edge on the longitudinal axis of the belt. A link insertion finger 125, operating in timed relation to the feeder arm 25, engages the tab 11 and causes it to be pressed through the aforesaid aperture. Thereafter, a spring 49 on the track 50 having a longitudinal extension 49a, engages the terminal end of the link 10 to prevent the link from being pulled back through the aperture upon removal of the link insertion finger 125. Simultaneously with this action, the hold down arm 75 begins its movement by engaging, in its split terminal end 76, the newly inserted link 10 along its body portion 13 while the bifurcated terminus 101 of the shaft 100 engages the tab 11 of the new link 10. The link is then twisted by the bifurcated terminus 101 and the hold down member 75 so that it aligns and forms a new link of the belt. Thereafter belt indexing mechanism 150 serves to engage and advance the belt 20 in the track 50, a distance of one aperture. Upon indexing of the belt the operation then commences once again by moving all of the aforementioned elements back to their starting or initial position.

*Timing of the machine*

In order to insure the proper sequential operation of the afore-mentioned elements, and as best illustrated in FIGS. 1 and 11–17, a cam shaft 200, supported on the frame 22 by spaced bearings 201 and 202, has mounted thereon a plurality of cams numbered 1 through 6. As illustrated in FIGS. 12–17, each of the cams is connected to the shaft 200, and each cam has a peripheral outline differing in shape, rise and descent, and radial size from the other in order that they may carry out their intended function. It is preferable, although not absolutely necessary, that each of the cams be made adjustable such as the cam 3, illustrated in FIGS. 11 and 12. This may be accomplished by securing a collar 250 to the shaft 200 by, for example, a set screw 251, which collar preferably abuts the cam. The cam is provided with an arcuate slot and an adjustment bolt or screw means permits securing the cam in any circumferential position desired. As seen in FIG. 11, each of the cams 1–6 has associated therewith bell cranks 1a–6a respectively, pivotably connected to a pivot shaft 203 which permits movement of the bell cranks substantially in a plane perpendicular to the pivot shaft 203.

Each of the cams 1–6 operates through its associated bell crank 1a–6a on separate linkage to impart, at appropriate timed intervals, the correct motion to the various elements of the machine. Cam number 1 for example, imparts through the bell crank 1a, movement to linkage 40 which linkage is operatively connected to the feeder arm 25 to permit the feeder arm to feed a link into position for engagement by the link insertion finger 125 above the working area 51 of the track 50. Cam 2, through the associated bell crank 2a imparts movement to the link insertion finger 125 through linkage 126 to engage the link 10 being fed by the link feeder arm 25. In a like manner, cam number 3, through its bell crank 3a connects linkage 151 to impart the necessary indexing motion to the belt indexing mechanism 150. Cam number 4, through its bell crank 4a connects various mechanism on the shaft 100 to cause lowering of the shaft and dis-engagement of the bifurcated terminus 101 from the tab 11 of the link after the link has been twisted.

The cam 5 is, in a like manner, connected through its associated bell crank 5a to other mechanism 77 slidably mounted on the shaft 100 which permits lowering and tilting of the hold down member 75 upon the link 10 being twisted to its proper position in the belt 20. Cam 5 operates in conjunction with cam 6, which, through its associated bell crank 6a and linkage 78 causes simultaneous rotative movement of the shaft 100 and the hold down arm 75 for twisting the link so as to align the link properly in the belt.

As best illustrated in FIG. 10, the cam shaft 200 extends axially beyond the bearing 201 and terminates in drive means 204, in the present instance a V-belt pulley or sheave 205 for causing rotary movement of the cam shaft 200. It should be recognized that the machine may be driven by any drive means available, including an electric motor, a gasoline engine, water power drive, such as by a water wheel, or even by a hand operated crank.

Each of the connections and the linkage abovementioned will be more fully described herein after in the section of the specification dealing with the particular element or elements discussed therein.

*Link feed arm and its operation*

As heretofore set forth, the feed arm 25 serves to receive, hold, and feed individual links to the work area 51 of the track 50 to permit engagement of a link being held thereby by the link insertion finger 125. To this end, and as best illustrated in FIGS. 1 and 4, the feed arm 25 comprises a channel member 26 having vertically spaced, substantially parallel legs 26a and 26b each having an outwardly flared, upwardly facing terminal end 27 for entry therein, of a link 10. The web 28 of the channel 26, in conjunction with a biasing spring, in the present instance a wire 29 extending longitudinally of the channel 26, serves to hold the link 10 from lateral movement in the channel 26. In both the upper and lower legs, 26a and 26b respectively, are inwardly biased shoulder guides 30a and 30b respectively, which guides serve to center the link 10 in the channel 26 by pressing against the upper and lower edges 17 of the link 10. As illustrated in FIG. 4 the lower shoulder guide 30b is upwardly biased by the spool and coil spring 31 and the upper shoulder guide 30a is adjustably biased downwardly, in the present instance by a leaf type spring (not shown).

In order that after insertion of the link 10 into the channel 26 of the feed arm 25, the link assuming a position substantially as that shown in FIG. 22 (solid line), the link insertion finger 125 may easily engage the link without becoming encumbered by the feed arm 25, the channel 26 is provided with locking tab guides 32 and 33 which project from the terminal end 34 of the channel and are spaced therefrom.

In order to permit movement of the feed arm 25 into a position where the locking tab 11 is superimposed in relation to the work area and the desired aperture in the last assembled link on the belt 20, the feed arm 25 is connected to the bell crank 1a through the interconnecting linkage 26 and thus the movement of the arm is controlled by the cam 1 as set forth above. In the present instance the linkage 26 comprises a laterally extending pivot 35 (see FIG. 10) connected to the feed arm 25 and including an adjustable stop 36 which limits counterclockwise movement of the feed arm 25. Connected to the laterally extending pivot 35 is an arm 37 which is rigidly secured to a rod 38 connected to the bell crank 1a by a pivot 39. (See FIG. 17.) As the follower of the bell crank 1a is biased against the cam 1, by a spring 40, the linkage 26 thus causes the feed arm 25 to follow the contour of the cam.

As illustrated in FIGS. 1 and 17, the feed arm 25 is in its furthest counterclockwise position with respect to the lateral pivot 35, but upon rotation of the cam 1, in a counterclockwise direction as viewed in FIG. 17, the feed arm will move clockwise about the pivot until the tab guides 33 and 34 overlie the work area 51 and underlie the link insertion finger 125.

In the event that it is desirable to make the machine 21 fully automatic, automatic link feed means, such as illustrated in FIGS. 36–40 may be provided to feed links to the feed arm 25 automatically when it is in its furthest counterclockwise position with respect to the lateral pivot 35. To this end, the automatic link feed means 300 may preferably comprise a hopper 301 augularly connected, with respect to the platform 23 of the frame 22 of the machine, to a feeder chute 302. The feeder chute is connected to the platform 23 by a bracket 317. (See FIG. 39.) The hopper 301 may be fed from an additional feed chute 303 from, for example, in an injection molding machine or the like. As illustrated in FIG. 36, the chute 303 has an aperture 304 in the lower portion thereof overlying and communicating with the hopper 301 to permit loading of links into the hopper. Preferably, the connection of the hopper 301 to the feeder chute 302 should be loose so that a vibrator 305, connected to the hopper 301 will cause the links 10 to pack in a substantially upright position such as shown in FIG. 38.

Upon the feed arm 25 moving to its furthest counterclockwise position, it is desirable that a fresh link be fed from the hopper 301 into the feeder chute 302 and then moved into position in the channel 26 of the feed arm. To this end, the terminal end 27 of the channel 26 is aligned with an aperture 306 in the adjacent aligned terminal end of the feeder chute 302. As illustrated in FIG. 37, the feeder chute 302 has a tubular cover 307 with an aperture 308 therein for permitting movement of a link into the interior of the chute from the hopper 301 Interiorly of the cover 307 is a slide arm 309 having a tapered terminal end 310, slidable in a dove-tailed guide 311 in the cover 307 by linkage 312 connecting the slide 309.

In operation, the slide 309 is timed to move a new link from the hopper 301 into the channel 26 of the feed arm 25 upon the feed arm reaching its furthest counterclockwise point of rotation. As illustrated in FIG. 40, the linkage 312 includes a bell crank 313 operable from a cam 314 which may be mounted on the cam shaft 200. The connecting linkage from the bell crank 313 includes an adjustable rod 315 (see FIG. 39) connected to the slide 309 through a slot 316 in one side of the cover 307. In this manner, new links may be inserted into the feed arm 25 for fully automatic operation to produce a belt 20 such as has heretofore been described.

*Link insertion finger and its operation*

As heretofore set forth, the link insertion finger 125 serves to engage the tab 11 of a link in the feed arm 25 and thereafter press the tab through the aperture 15 in the last link of the belt 20 lying on the track. To this end, and as best illustrated in FIG. 25, the link insertion finger 125 comprises an angulated L-shaped bracket having a leg 126 and a flat portion 127. The tip of the leg 126 serves to engage the shoulder 11a of the link 10 in the feed arm 25 upon lowering of the link insertion finger 125 into engagement with the link's tab when the feed arm is superimposed of the work area 51. As illustrated in FIG. 22, the flat portion 127 embraces the surface of the tab 10 in the feed arm 25 upon the leg 126 engaging the shoulder 11a of the link 10. The link insertion finger 125 is connected to a bracket 128 by a pivot pin 129, the finger 125 being biased clockwise about the pivot 129 by a spring 130 which permits limited counterclockwise movement of the finger 125 upon insertion of the finger and the link into the afore-mentioned aperture in the belt 20 in the working area 51, and upon indexing of the belt 20.

The operation of the insertion finger 125 is best illustrated in FIGS. 22–30, FIG. 22 illustrating the feed arm 25 as it moves from a first position clockwise about the laterally extending pivot 35 into a second position superimposed relative to the working area 51 and underlying the link insertion finger 125. Simultaneously with the movement of the feed arm 25 into the second position, the leg 126 of the link insertion finger 125 engages the shoulder 11a of the link 10 held by the feed arm 25. Continued downward movement of the finger 125 along with movement of the feed arm 25 in a counterclockwise direction causes the link 10, held by the feed arm, to be removed from the channel 26 and the tab 11 of the link to be inserted in the forward aperture 15 of the uppermost link of the belt 20 and the trailing aperture 16 of the lowermost link. As illustrated in FIG. 28, the action continues until the insertion finger is moved in the opposite direction, i.e. withdrawn from the apertures. (See FIG. 30.)

The means by which the link insertion finger 125 is afforded its motion to insert a new link into the belt 20 is best illustrated with references to FIGS. 1, 10, and 16. As illustrated in FIG. 10, the frame 22 mounts a platform 23 having an upstanding bracket 24 thereon mounting on the upper terminal edge thereof the laterally extending pivot 35 associated with the feed arm 25. A horizontally extending brace 131, in addition to providing the stop motion for the stop 36, houses a pair of bushings 132a and 132b through which a pair of upright shafts 134 and 135 project. In addition, a lower rung 22a of the frame 22 as well as the platform 23 house like bushings 136 through which pass the shafts 134 and 135. It should be noted that bushings 136 as well as the bushings 132a and 132b permit vertical sliding movement of the rods or shafts 134 and 135.

The bracket 128 associated with the link insertion finger 125 is connected to a pivot shaft 137, biased counterclockwise by a wound spring 138, and passing through a block 139 rigidly connected to the shafts 134 and 135 and therefore capable of vertical movement therewith. A brace 140 is connected to the pivot shaft 137 and has an adjustable stop 140a thereon for engaging a projection 139a mounted on the block 139. For reasons which will become more evident hereinafter, the brace 140 overlies an upwardly projecting camming member 141 mounted on the platform 23.

As may readily be seen, lowering of the block 139 will cause lowering of the link insertion finger 125, and upon the brace 140 striking the camming member 141 (see FIG. 28) the pivot shaft 137 will rotate, in a clockwise direction (as viewed in FIGS. 1 and 22) carrying out the desired function as hereinabove set forth.

In order to provide movement of the shafts 134 and 135 in the vertical plane, a block 142 is secured to the shafts and biased upwardly by a pair of coil compression springs 143 concentrically positioned about the shafts and a tension spring 144. As best illustrated in FIG. 16 a camming portion 145 of the bell crank 2a engages the upper portion of the block causing the block, secured to the shafts, to follow the movement of the outline of the cam 2.

Hold down arm and tab twister

As previously described, upon the link insertion finger 125 inserting the tab 11 into the portion of the belt 20 overlying the working area 51, the split terminal end 76 of the curved hold down arm 75 moves into position, as illustrated in FIG. 30, to embrace the body 13 of the newly inserted link 10. Simultaneously with this action, the tab 11 of the newly inserted link 10 is engaged by the bifurcated terminus 101 of the shaft 100. The link is then twisted by the afore-mentioned members causing the link to axially align with the assembled links of the belt and thereby form a new link of the belt. Thus, both the hold down arm 75 and the shaft 100 are rotated approximately 90°, and thereafter the hold down arm 75 is tilted so as to permit only limited engagement with the newly inserted link and cause it to lie substantially flat relative to the belt 20 while the shaft 100 is moved downwardly to disengage the tab 11 of that link.

To this end the hold down arm 75 has a pair of laterally spaced legs 79 and 80 for pivotal connection to a hub 81 having circumferentially spaced, bifurcated radial extensions 82. The hub is prevented from axial movement by a collar 95 secured to a flange 83 rigidly connected to the platform 23 of the frame 22. (See FIGS. 18–21.) As illustrated in FIGS. 19 and 21, the hub 81 has an offset 84 and a pin 84a thereon for connection to the linkage 78 associated with the bell crank 6a and therefor, although prevented from axial movement with respect to the shaft 100 by the collar 95, is permitted rotative movement by following the peripheral outline of the cam 6. In a manner which will hereinafter be described, both the shaft 100 and the hold down arm 75 rotate together.

In order to permit first raising of the hold down arm 75 into a position wherein the split terminal end 76 thereof engages and embraces the body 13 of a link 10, while permitting limited movement of the hold down arm in a position 90° from that point so as to disengage the link after it has been twisted to the final position, hold down arm tilt means are provided. In the present instance, the tilt means comprises a collar 85 keyed to the shaft 100 but capable of axial movement with respect thereto. The collar 85 has a pair of upwardly extending projections 86 and 87, engagable and axially slidable in the bifuracted radial extensions 82 of the hub 81. Thus as the collar 85 is keyed to the shaft 100 and coupled to the hub 81 by the projections 86 and 87, rotative movement of the hub 81 by the linkage 78 also causes rotative movement of the shaft 100.

To provide tilting of the hold down arm 75, connected to one of the projections, in the present instance projection 87, is a pin 88 which through an adjustable rod 89 connects the arm 75. (See FIG. 18.) As best illustrated in FIGS. 18 and 21, the collar 85 has a circumferential groove 90 for receiving therein a yoke 91 connected to the bell crank 5a. Thus tilting of the hold down arm 75 is provided at the time prescribed by the cam 5.

In order that the bifurcated terminus 101 of the shaft 100 engages and disengages the tab at the correct time, a pulley 94 is keyed and secured to the shaft 100, the pulley 94 has a circumferential groove 92 therein for receiving a yoke 93 associated with the bell crank 4a to cause axial movement of the shaft 100 upon rotation of the cam 4. (See FIG. 13.)

Belt indexing mechanism and its operation

As best illustrated in FIG. 21, the split terminal end 76 of the hold down arm 75 is fork-like in construction, with one of the prongs, notably prong 76a longer than the prong 76b whereby upon tilting of the hold down arm 75 (see FIG. 33) the prong 76a will continue to overlie and hold down the body 13 of the link 10. In this manner, upon indexing of the belt by the belt indexing mechanism 150, the link is caused to flatten out substantially as shown in FIG. 34.

As best illustrated in FIGS. 5–9, the track 50 serves to hold the belt 20, regardless of the belt width, and allows indexing of the belt at appropriate timed intervals by the belt feed mechanism 150. To this end, the track 50 has a pair of laterally spaced and laterally adjustable rails 55 mounted in a longitudinal guide block 56 secured to the platform 23 of the frame 22. As shown in FIGS. 7 and 9, the rails 55 have axially extending pins 57 engageable in the guide block 56 and settable for any predetermined width belt by, in the present instance, lockable machine screws 58. Thus, by adjusting the machine screws 58, the rails 55 may be laterally adjusted to accommodate any width belt 20.

In order that the belt 20 is pressed firmly downward adjacent the working area 51 of the track 50, a vertical biasing or hold-down block 59 having an upstanding vertically movable riser portion 60, is provided. As illustrated in FIG. 7, the riser portion 60 of the biasing block 59 is manually operable by a handle 61 which cams the riser portion downwardly to press the lower portion thereof against the upper surface of the belt 20.

Upon insertion, twisting of the link 10 by the bifurcated terminus 101 of the shaft 100 and the curved hold down arm 75, the belt index system 150 is actuated by cam 3 (see FIG. 12) moving the linkage 151 to cause a dog 152 to advance the belt 20 a distance of one aperture. To this end, the bell crank 3a, having a laterally offset portion 3b and connecting the upstanding portion 3c of the bell crank 3a, is made adjustable by means of a laterally extending pin 3d and a pair of set screws 3e. In this manner, the throw of the linkage 151 about the pivot shaft 203 may be adjusted to compensate for links having differing axial lengths.

As illustrated in FIGS. 5, 6, and 11, the linkage 151 comprises a rod 153 connected to a sleeve 154, which through an arm 155, permits movement of the dog 152 longitudinally of the belt 20. The dog 152 is loosely pivoted about a shaft 156 and has a lower stepped portion 157 for engaging an aperture in the uppermost link 10 of the belt 20. As heretofore set forth, the longitudinal throw of the dog 152 is sufficient to permit axial movement of the belt 20 a distance of one aperture, thus aligning the last link 10 assembled in the belt 20 properly in the working area 51 to permit insertion of a new link 10.

Summary of operation

The simultaneous operation of the above-described mechanism is best illustrated with reference to the cams and associated linkage illustrated in FIGS. 11–17 with special reference to the cam timing chart illustrated in FIG. 35. As shown in the cam timing chart, the 0° position is the position of the cams and the machine elements as they appear in FIGS. 1 and 11–17. Thus, by selecting a position on the abscissa of the chart, i.e. any rotative angle of the cams from their position shown in the above-mentioned figures, tracing of the ordinate will indicate the movement and the relative position of any of the mechanism heretofore described.

In summary, the machine of the present invention provides novel apparatus for automatically assembling a link-type belt, specifically of the type disclosed in United States Patent No. 3,154,961.

While the invention has been described with a certain degree of particularity, it is understood that the present disclosure has been made only by way of example and that numerous changes in the details of construction and the combination and arrangement of parts may be made without departing from the spirit and the scope of the invention as hereinafter claimed.

What is claimed is:

1. Apparatus for assemblying links into a link type belt each of said links having a tab, an integral body portion connected to the tab through a constricted neck portion and at least one aperture, said links assuming a superimposed successive overlapping relation when in belt form; and said apparatus comprising in combination: a frame having a work area and track means for receiving said belt, said work area located at the terminus of said track means; arm means mounted on said frame for receiving, holding and feeding an individual link to a position superimposed in relation to said work area; link insertion means overlying said work area, operative to engage said individual link and remove it from said feed means upon said feed means assuming a position superimposed relative to said work area; said link insertion means including means to engage and insert the tab of said link into an aperture in said portion of said belt positioned in said work area; timing means interconnecting said feed arm means and said link insertion means to cause said means to operate in timed sequence; and belt advancing means, connected to said timing means to engage said belt in said track means and advance said belt.

2. Apparatus for assemblying links into a link type belt in accordance with claim 1 wherein said feed arm means includes means for holding a link edge-wise, longitudinally aligned of said track.

3. Apparatus in accordance with claim 2 including link hold down and twisting means engageable with said link, operative after its insertion into said belt, for twisting said link from its edge-wise position to a position superimposed and overlapping and thereby longitudinally aligned of said track; and means interconnecting said hold down and twisting means with said timing means.

4. Apparatus in accordance with claim 3 wherein said link twisting means comprises a curved hold down arm superimposed in relation to said work area and operable to embrace the body of said individual link upon insertion into said aperture of said belt in said work area, and a shaft underlying and perpendicular to said work area and having a bifurcated terminus to engage the tab of said individual link.

5. Apparatus in accordance with claim 1 wherein said timing means comprises a cam shaft rotatably mounted on said frame, said cam shaft having a plurality of cams carried thereon and drive means connected to said cam shaft to cause rotation thereof.

6. Apparatus in accordance with claim 1 wherein said feed arm comprises a channel and includes means for embracing a link in said channel whereby upon said feed arm assuming a position superimposed in relation to said work area said link is positioned edge-wise and longitudinally aligned of said track.

7. Apparatus in accordance with claim 1 wherein said link insertion finger comprises an angulated L-shaped bracket having a leg portion and a flat portion, said leg portion engageable with the shoulder of said tab when said feed arm is superimposed in relation to said work area and said flat portion embraces a surface of the tab.

8. Apparatus in accordance with claim 1 wherein said track means comprises a pair of laterally spaced longitudinally extending rails, at least one of said rails adjustably mounted on said frame to accommodate differences in width of said belt.

9. Apparatus in accordance with claim 8 wherein said belt advancing means comprises a dog engageable in said track against said belt to advance said belt at least a distance of one aperture.

10. Apparatus in accordance with claim 7 including a hold down block adjacent said work area and having an upstanding vertically movable riser portion, said riser portion operable to press against the upper surface of said belt to hold said belt terminus in said work area.

11. Apparatus in accordance with claim 1 wherein said aperture in said link is longer in the axial direction of said link than in the width wise direction, and wherein said feed arm means comprises a channel having vertically spaced substantially parallel legs each having an outwardly flared upwardly facing terminal end for entry therein of a link in edge wise relation and longitudinally aligned of the track, and biasing means associated with said channel to prevent lateral movement of said link in said channel.

12. Apparatus in accordance with claim 11 including automatic feed means comprising a hopper connected to a feeder chute, said feeder chute located adjacent said feeder arm and having an outlet communicating with said flared terminal end of said channel, said feeder chute having slide arm means engageable with a link positioned therein for feeding said link into said feed arm.

13. Apparatus in accordance with claim 12 wherein said slide arm means includes linkage connected to said timing means.

14. Apparatus in accordance with claim 1 including spring means mounted on said frame engageable with the terminal end of a link upon its insertion through the aperture of the link in the work area whereby disengagement of said newly inserted link is prevented upon removal of said link insertion means.

References Cited

UNITED STATES PATENTS 2,508,191   5/1950   Raggi _____ 59—3

CHARLES W. LANHAM, *Primary Examiner.*

G. P. CROSBY, *Assistant Examiner.*